Figure 8:
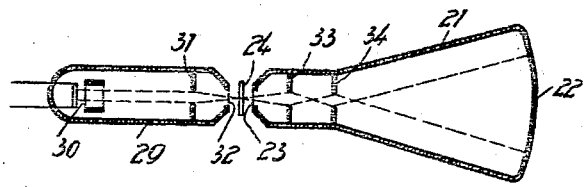

Oct. 27, 1936.   R. RÜDENBERG   2,058,914
APPARATUS FOR PRODUCING IMAGES OF OBJECTS
Filed May 27, 1932    3 Sheets-Sheet 2
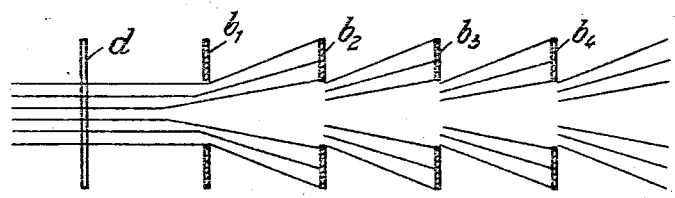
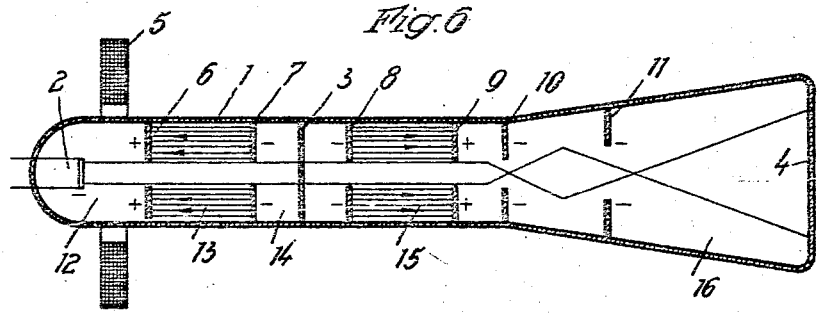
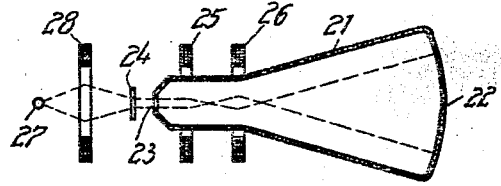
Inventor
Reinhold Rüdenberg
by Knight Bro
attorneys Oct. 27, 1936.  R. RÜDENBERG  2,058,914
APPARATUS FOR PRODUCING IMAGES OF OBJECTS
Filed May 27, 1932

Inventor
Reinhold Rüdenberg
by Knight Bros
attorney

Patented Oct. 27, 1936

2,058,914

UNITED STATES PATENT OFFICE 2,058,914

APPARATUS FOR PRODUCING IMAGES OF OBJECTS

Reinhold Rüdenberg, Berlin-Grunewald, Germany, assignor to Siemens-Schuckertwerke Aktiengesellschaft, Berlin-Siemensstadt, Germany, a corporation of Germany Application May 27, 1932, Serial No. 613,857
In Germany May 30, 1931

12 Claims. (Cl. 250—27.5)

My invention relates to apparatus for producing images of objects.

Owing to the fact that in fieldless spaces electron rays travel, similar to light rays, in straight paths, an object impervious to the rays, when placed in a divergent bundle or beam of rays, produces an enlarged shadow on a fluorescent screen onto which the rays are projected.

In cathode-ray oscillographs, electro-magnetic fields surrounding the beam concentrically and causing a stricture of the beam are often employed. These fields have an effect on a beam of rays similar to that of an optical lens on a beam of light; they may cause the rays of the beam to become convergent or divergent. Consequently, with such stricture fields an enlarged or a reduced luminous image of the cathode ray beam is, according to circumstances, also obtained on the fluorescent screen.

This enlargement or magnification of shadows has hitherto been regarded only as a secondary phenomenon of minor technical importance in the use of electron rays. The reduction has in the past only been employed to obtain a sharply defined luminous spot (focus).

According to my invention, the effect, similar to that of lenses in optics, produced by fields of force surrounding concentrically a beam of electrons and exerting a radial influence on same, is utilized for enlarging objects in a manner corresponding to that obtained with optical magnifying glasses and microscopes. For this purpose the object to be enlarged is exposed to an electron ray or a beam of rays, and before or behind the object, the beam is by means of lens-like acting fields made convergent or divergent.

In Figures 1 to 5 of the drawings the principle of the invention is explained. Figures 6 to 11 illustrate various manners of carrying out the invention.

Fig. 1 shows a magnetic stricture coil, the length of which is small compared with the length of the path of the beam of rays. The rays are forced by the magnetic field toward the axis of the coil, coinciding with the axis of the beam, so that the rays meet in a focal spot or a focal line. In the case of homogeneous rays they meet in one focal point.

The same effect can according to the present invention also be obtained by means of electrostatically charged stops or diaphragms disposed in the main symmetrically round the axis of the rays. In Fig. 2 a stop of that kind is illustrated. The electrostatic field is represented by its lines of force. The charge on the stop $a$ is assumed to be negative. When the electrons of a beam or bundle of cathode rays pass through the stop they are repelled by same. They are, therefore, deflected from their original paths, which are assumed to be parallel, towards the center and are assembled to a convergent beam meeting in the focal point $\theta$, beyond which they then diverge. As the radial component of the field strength of the stop is zero in its axis and increases outwardly in linear proportion to the distance, the degree of deflection of the electron rays also increases with the distance from the beam and stop axis. This causes all the rays to meet in the same focal spot. To obtain with sufficient accuracy this proportional relation of the radial field strength to the distance from the axis, it is advisable to make the opening of the stop considerably larger than the diameter of the original beam, or, by choosing a special shape for the electrodes, to give the field the suitable shape.

If the potential of the diaphragm is assumed to be positive instead of negative, the electron rays will be attracted by the stop. The rays of the beam which till then were moving in parallel paths now become divergent, as shown in Fig. 3. The negative stop, therefore, has the same effect as a convex lens in optics, and the positive stop has that of a concave lens. By combining stops of that kind, all the devices known in optics and based on converging or diverging beams can be imitated for electron rays. It is in this manner possible, for example, to make a microscope or a telescope for use with direct or reflected electron rays, by proportioning the relative distances between the object, the diaphragm or stop and the projection screen in accordance with the general optical formula $$\frac{1}{a}+\frac{1}{b}=\frac{1}{f}$$

in which $a$ represents the distance between the object and the lens (in this case the diaphragm), $b$ the distance between the lens and the screen, and $f$ the focal length of the lens (in the present case the distance at which the charged diaphragm brings the parallel beam to a focal point).

It should be noted, however, that in all cases the beam itself is not deflected from the direction of its original axis, but only the individual electron rays are deflected symmetrically to the axis, some rays more than others in accordance with their proximity to the beam axis.

Magnifiers, microscopes and telescopes constructed in this manner enable observations to be made which are impossible with optical investigations and also permit, regarding the order of magnitude, a considerably greater enlargement to be obtained than is possible with optical instruments, whose resolving power is limited by the wave-length of light. This limitation does not exist with magnifiers operating with electron rays, as the wavelength of these rays is several orders of magnitude smaller than that of light.

As the deflection of the electron rays depends upon their velocity, a sharply defined focus is only obtained when operating with homogeneous cathode rays. It is, therefore, advisable to make the beam homogeneous before exposing to its rays the object to be magnified. The homogeneity can be obtained in the known manner, for example, by passing the rays through several velocity stops having the same potential. According to my invention the homogeneity can also be obtained by utilizing the lens-effect of radially acting magnetic or electrostatic fields. An example for this is illustrated in Fig. 4. In this figure, $S_k$ represents diagrammatically the complete source of cathode rays, including the cathode and the anode, not shown here in detail since the construction of such sources is well-known in the art. Therefore, $S_k$ represents any suitable means for producing a cathode ray beam. From this means the beam emanates and disperses in the usual way as shown. This beam is directed through stop $a_1$, assumed to be electrostatically negatively charged as in Fig. 2, and thereby so directed as to constitute a beam of almost parallel rays in the manner described and shown in my copending application Serial No. 615,260. For charging the stop or apertured diaphragm $a_1$, as well as for charging the stops $a_2$, $a_3$, $a_4$ to be referred to hereinafter, any suitable means, for charging grids or the like, may be employed. Arrangements of this kind for differently biasing in an electron emission tube intermediate electrodes, with respect to the cathode and anode of the tube, are old in this art and widely used nowadays for this and similar purposes. They are disclosed, for instance, in the U. S. Patent No. 1,537,708 to Walter Schottky. Stop $a_2$, also assumed to be negatively charged in this particular example, further affects the cross-sectional area of the beam so that it tapers toward a focal point on the beam axis. Generally speaking, and as also stated in the annexed claims, these stops or apertured diaphragms represent means for electrically imposing radial forces upon the beam proportioned in direct ratio to the distance from the axis of the beam, to change the cross-sectional area of the beam so that it tapers toward a focal point. This focal point may, as shown in the example Fig. 4, be located beyond the stop in the beam direction, or it may be located ahead of it, as shown for instance in Fig. 3, the same as in case of a light beam its focus may lie beyond or ahead of a lens, depending upon the optical construction of the latter. Referring again to Fig. 4, adjacent to or at the focal spot $o_1$, at which all rays of the same speed focus, and which may be the focal point of the rays of the desired speed, an apertured stop $c$ is placed. This stop may be assumed to be charged positive or negative with respect to the cathode or may have the potential zero as shown. As the bundle of rays also contains rays having different velocities, the focal point would not be sharply defined, if the stop $c$ were omitted, and the individual focal points of the rays having different velocities would be distributed over quite a length of the beam axis. The narrow aperture stop $c$, however, keeps back all the rays whose focal points are otherwise situated than at $o$. Consequently the bundle of rays after passing through the stop $c$ diverges and contains only, or at least for the greater part, rays having a definite velocity.

The divergent and homogeneous bundle of rays leaving the stop $c$ is made parallel by another stop $a_3$. Behind the stop $a_3$ the object $d$ to be magnified is placed in the path of the rays and is enlarged by means of a fourth stop $a_4$ charged to converge the rays as shown in Fig. 2.

In the example illustrated in Fig. 4, a separate stop is for clearness' sake employed every time the beam is influenced. It is, however, possible to reduce the number of stops, or, according to prevailing conditions, to increase it. Behind the stop $a_4$, further stops may be placed which together with the stop $a_4$, having the effect of a magnifying glass, produce a magnification similar to that obtained with a microscope or a telescope. An example of this kind of arrangement is shown in Fig. 5. The homogeneous parallel beam or bundle of electron rays penetrates the body $d$ to be examined and then passes through a series of divergent stops $b_1$, $b_2$, $b_3$, $b_4$ accordingly positively biased, for instance in the manner shown in Fig. 4. The first stop $b_1$ increases the cross-sectional area of the beam to a certain value, the second diaphragm $b_2$ acts on a small part of the increased area of the beam and re-increases same, etc.

In this manner a cascade-like magnification is obtained. Assuming that the stops all have the same coefficient of magnification, the magnification obtained with $n$ stops is equal to the coefficient of magnification to the $n^{th}$ power. With this kind of cascade arrangement large magnifications can be obtained, without it being necessary for the field of the individual stops to have an inconveniently high field intensity. Similar results can also be obtained with accordingly biased convergence stops or with arrangements containing both convergence and divergence stops. The object $d$ to be magnified may consist, for example, of a thin layer or film to be observed, which, whilst weakening the electron rays more or less, allows them to pass through it. Arrangements according to the invention are also applicable in which the object to be examined is itself a source of electron rays, the latter being either directly produced rays or reflected rays or secondary rays. In that case it is possible with the use of charged diaphragms to obtain images corresponding to the real or virtual images in optics. In all such cases the screen (such as 4 in Fig. 6) on which the image of the object is visible, must of course be located, the same as in optical devices, in the focal plane of the rays deflected by the fields of force. According to the invention, microscopes and telescopes based on such images can also be constructed.

The principles of optics can, therefore, to a wide extent be applied to arrangements effecting by means of electron rays a magnification of an object to be observed. This applies to the electrostatically acting arrangements described in the examples as well as to arrangements with magnetic convergence and divergence fields.

Under certain conditions, it is advisable to apply different vacua to different parts of the path of the rays. It may also be advantageous to impart a different speed to the electron beam at the different parts of its path, in order to obtain as bright an image as possible and to be to a great degree independent of disturbing influences. It is, for example, advisable to use rays of greater velocity. This has, however, in certain cases the drawback of making the use of the arrangement more difficult when examining living objects. In such cases, slowly moving electrons and a low vacuum may be more advantageous to avoid the destruction of the object to be examined and to obtain good contrasts.

Fig. 6 shows an example of reducing the invention to practice in a form in which the above difficulties can be avoided. The numeral 1 indicates the envelope of the device, 2 the cathode mounted therein, 3 the object to be magnified and 4 the luminous screen, located in the focal plane of the deflected rays. 5 is a collective electric lens which imparts, as may be desired, a parallel or a converging character to the electron beam emitted from the cathode 2. The anode voltage between the cathode and the stop 6 is, in the illustrated example, chosen at a high value in order to produce as large a number of electrons as possible. The electrons, therefore, have a considerable velocity. To avoid the rays from striking, and destroying, at this velocity, the object 3 to be enlarged, and in order to obtain better contrasts, another stop 7 is provided and negatively charged with respect to the stop 5 and to the electron beams. Between the stops 6 and 7, an electrostatic field acting in the longitudinal direction of the beam is, therefore, arranged which diminishes the velocity of the rays. When passing through the object 3 the beam, consequently, has a comparatively low velocity.

Behind the object are two further stops 8 and 9, of which the stop 8 is negatively charged and the stop 9 positively charged. The two stops produce in the space between them a longitudinal field which re-accelerates the beam. Behind the stop 9, the stops, or coils, 10 and 11, as the case may be, necessary for enlarging purposes are placed and serve for the magnification of the produced image.

The vacuum may be different in the different sections of the apparatus. In the space 12, accommodating the cathode 2 and separated from the remaining part of the discharge vessel by the stop 6, for example, a high degree of vacuum favorable for the production of the electron rays is maintained. In the velocity-diminishing space 13 between the stops 6 and 7, a medium degree of vacuum is applied. In the space 14 between the stops 7 and 8, where the object 3, the image of which is to be produced, is placed, the degree of vacuum is made to be as low as possible; in the accelerating space 15 between the stops 8 and 9, a medium degree of vacuum is employed, and in the space 16 between the stop 9 and the fluorescent screen 4, in which are the image-forming and magnifying sets, the degree of vacuum is high. The degree of vacuum in the separate sections can be produced and kept constant through continuous exhaustion.

Fig. 7 shows an arrangement in which the object to be examined is placed in air of normal pressure and is observed through a window (Lenard window). The object to be examined is exposed, to the beam of rays emitted from a hot cathode or given off by a radioactive substance or the like. The vacuum tube 21 with the fluorescent screen 22 is closed toward the object 24 by a Lenard window 23. The numerals 25 and 26 indicate magnet coils influencing the electron beam. 27 is the source producing the electrons. The bundle of rays emitted by it can be means of a stricture coil 28 or the like be made convergent or parallel.

If the beam of cathode-rays used is produced electrically, the rays can also be projected through a window from the space in which they are generated onto the object to be magnified. An arrangement of that kind is illustrated by Fig. 8. In the vacuum tube 29 is located a hot cathode 30. The beam emitted by the cathode is made convergent by an electrostatic stop 31 or the like and falls upon the object 24 through the window 32. The course of the rays in the vessel 21 is in this example influenced by electrostatic stops 33 and 34.

The distance between the object and the windows through which the rays leave and enter the vessels is made as short as possible to avoid as much as possible the absorption of the cathode rays by the air. In order to reduce the absorption, these parts of the space can also be enclosed in a vessel with as low a vacuum as the object will bear without injury.

Figure 9:
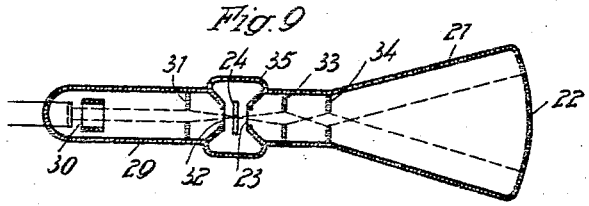

An arrangement of that kind is represented in Fig. 9. The space situated between the two vacuum vessels 29 and 21 and containing the object is surrounded by an envelope 35 in which a low vacuum is produced.

Figure 10:
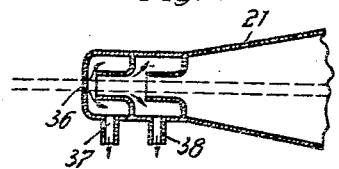

If the beam of rays for producing the image of the object is very narrow, the Lenard window may under certain circumstances be omitted, and the electrons be caused to enter and leave the vacuum vessel only through a fine opening. In that case a powerful suction device is provided immediately behind the opening 36, as shown in Fig. 10, by the means of which the air entering the vacuum through the opening is removed in one or more steps. In Fig. 10 two steps with a suction pipe each, 37 and 38 respectively, are shown.

The object whose image is to be magnified by means of electron rays should, if it has to be penetrated by the electrons, be made as thin as possible. To impart to the object in such cases the necessary consistency and stability, it is advisable to place it between two foils, the thickness of which is only a very small fraction of a millimeter and the density of whose material must be as small as possible in order not to retard the electron rays to too great an extent. It is expedient to use very fine foils of metal such as gold, silver or aluminum foil.

As mentioned above, it is by means of arrangements according to my invention possible to make fine details visible which are far beyond the optical resolving power, limited by the wavelength of light.

Figure 11:
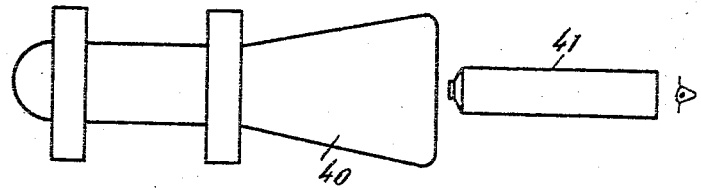

Owing to the imperfection of the lens-effect of the magnetic and electric fields, it is often very difficult to increase the magnification beyond a certain number of times, which is, of the order of the lower powers of ten. In that case the magnification can be carried out in two steps, by employing an optical microscope in addition to the electron microscope. Fig. 11 illustrates an arrangement of that kind. The electron-microscope is indicated by 40 and the optical microscope by 41. The image produced on the screen of the electron-microscope is enlarged to a size easily attainable with electron rays, and has, for example, a magnification of the order of 100 times the original size after which the optical microscope 41 may easily continue the enlargement.

In order to obtain a clear image on the fluorescent screen, it is necessary for the grain of that screen to be as fine as possible. It is advantageous to employ a ground homogeneous plate made of a single crystal, which, when struck by the bundle of rays, shows the image without distortion.

The electrical and the optical parts of the arrangement may be combined to a single apparatus.

I claim as my invention:

1. Apparatus for projecting in an extended plane a stationary, visible image of an object onto a screen by means of electrically charged rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for electrically imposing radial forces upon said beam proportioned in direct ratio to the distance from the axis of the beam to change the cross-sectional area of the beam so that it tapers toward a focal point, an envelope containing at least said screen and said means for imposing radial forces, the relative distances between said object point, said means for imposing radial forces, said focal point and said screen being proportioned to satisfy the general optical formula $$\frac{1}{a}+\frac{1}{b}=\frac{1}{f}$$

to produce a sharply defined multiple size image of the object on said screen.

2. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing an electromagnetic field of force surrounding said beam and imposing thereon radial forces proportioned in direct ratio to the distance from the axis of the beam to change the cross-sectional area of the beam so that it tapers toward a focal point, an envelope containing at least said screen and said field producing means, the relative distances between said object point, said field producing means, said focal point and said screen being proportioned to satisfy the general optical formula $$\frac{1}{a}+\frac{1}{b}=\frac{1}{f}$$

to produce a sharply defined image of the object on said screen, different in size from said object.

3. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing an electrostatic field of force surrounding said beam and imposing thereon radial forces proportioned in direct ratio to the distance from the axis of the beam to change the cross-sectional area of the beam so that it tapers toward a focal point, an envelope containing at least said screen and said field producing means, the relative distances between said object point, said field producing means, said focal point and said screen being proportioned to satisfy the general optical formula $$\frac{1}{a}+\frac{1}{b}=\frac{1}{f}$$

to produce a sharply defined multiple size image of the object on said screen.

4. Apparatus for projecting in an extended plane a stationary, visible image of an object onto a screen by means of electron rays, comprising means for producing said rays, means for producing a field of force for condensing said rays into a parallel beam of rays and for projecting it on a given directional axis, a screen sensitive to said rays disposed in the path of said rays, said apparatus having an object point on said axis between said ray producing means and said screen, means disposed between said object point and said screen for producing a field of force surrounding said beam and imposing thereon radial forces proportioned in direct ratio to the distance from the axis of the beam to change the cross-sectional area of the beam so that it tapers toward a focal point, an envelope containing at least said screen and said field producing means, the relative distances between said object point, said field producing means, said focal point and said screen being proportioned to satisfy the general optical formula $$\frac{1}{a}+\frac{1}{b}=\frac{1}{f}$$

to produce a sharply defined multiple size image of the object on said screen.

5. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing a plurality of spaced fields of force, each field adapted to completely surround said beam for electrically directionally controlling the rays of the beam as modified by said object in proportion to their different distances from said axis so as to cause the beam to taper toward a focal point, an envelope containing at least said screen and said deflecting field producing means, the system, comprising said object point, said several spaced fields, said focal point and said screen, being proportioned to satisfy the general optical formula $$\frac{1}{a}+\frac{1}{b}=\frac{1}{f}$$

so as to produce a sharply defined, multiple size image of the object on said screen.

6. Apparatus for projecting in an extended plane a stationary, visible image of an object onto a screen by means of electrically charged rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for electrically imposing radial forces upon said beam proportioned in direct ratio to the distance from the axis of the beam to change the cross-sectional area of the beam so that it tapers toward a focal point, an envelope containing at least said screen and said deflecting means, the relative distances between said object point, said means for imposing radial forces, said focal point and said screen being proportioned to satisfy the general optical formula $$\frac{1}{a}+\frac{1}{b}=\frac{1}{f}$$

to produce a sharply defined multiple size image of the object on said screen, and a plurality of apertured diaphragms adapted to be electrically differently charged in the required manner with respect to said beam producing means, and alined on said axis in front of and behind said object point in the beam travel direction, for retarding and accelerating respectively the speed of the electrons.

7. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing a plurality of spaced fields of force, each field adapted to completely surround said beam for electrically directionally controlling the rays of the beam as modified by said object in proportion to their different distances from said axis so as to cause the beam to taper toward a focal point, an evacuated envelope containing said beam producing means, said object point, said field producing means and said screen, the envelope portion for containing said object point having a degree of evacuation lower than the evacuation degree of the remaining envelope portions, the system comprising said object point, said several spaced fields, said focal point and said screen being proportioned to satisfy the general optical formula $$\frac{1}{a}+\frac{1}{b}=\frac{1}{f}$$

so as to produce a sharply defined, multiple size image of the object on said screen.

8. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing a plurality of spaced fields of force, each field adapted to completely surround said beam for electrically directionally controlling the rays of the beam as modified by said object in proportion to their different distances from said axis so as to cause the beam to taper toward a focal point, an evacuated envelope containing said beam producing means, said object point, said field producing means and said screen, the envelope portion containing said object point having an evacuation degree lower than the evacuation degree of the remaining envelope portions, the system comprising said object point, said several spaced fields, said focal point, and said screen, being proportioned to satisfy the general optical formula $$\frac{1}{a}+\frac{1}{b}=\frac{1}{f}$$

so as to produce a sharply defined, multiple size image of the object on said screen, means for retarding the speed of the electrons in a given portion of said envelope, means for increasing the electron speed in another given portion of said envelope, the envelope portion in which the electron speed is retarded having a lower evacuation degree than the envelope portion in which the electron speed is increased.

9. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing a plurality of spaced fields of force, each field adapted to completely surround said beam for electrically directionally controlling the rays of the beam as modified by said object in proportion to their different distances from said axis so as to cause said beam to taper toward a focal point, an evacuated envelope containing said beam source, said object point, said field producing means and said screen, the envelope portion containing said object point having an evacuation degree lower than the evacuation degree of the remaining envelope portions, the system comprising said object point, said several spaced fields, said focal point, and said screen being proportioned to satisfy the general optical formula $$\frac{1}{a}+\frac{1}{b}=\frac{1}{f}$$

so as to produce a sharply defined, multiple size image of the object on said screen, means for retarding the speed of the electrons in a given portion of said envelope, means for increasing the electron speed in another given portion of said envelope, the envelope portion in which the electron speed is retarded having a lower evacuation degree than the envelope portion in which the electron speed is increased, and means for maintaining the difference in evacuation degrees between the several envelope portions.

10. Apparatus for projecting in an extended plane a stationary, visible image of an object onto a screen by means of electron rays, comprising means for producing a beam of said rays and for projecting it on a given directional axis, a screen sensitive to said rays and being disposed in the path of said beam, said apparatus having an object point on said axis between said ray producing means and said screen, means disposed between said object point and said screen for producing a field of force surrounding said beam and imposing thereon radial forces proportioned in direct ratio to the distance from the axis of the beam to change the cross-sectional area of the beam so that it tapers toward a focal point, an evacuated envelope enclosing said field producing means and said screen, and a Lenard type window at the entrance end of said envelope for permitting said rays to enter the envelope after they have passed the object, the relative distances between the object point, said deflecting field, said focal point, and said screen being proportioned to satisfy the general optical formula $$\frac{1}{a}+\frac{1}{b}=\frac{1}{f}$$

to produce a sharply defined multiple size image of the object on said screen.

11. Apparatus for projecting in an extended plane a stationary, visible image of an object onto a screen by means of electron rays, comprising a suitably evacuated envelope containing means for producing a beam of said rays in the direction of a given envelope axis, a second suitably evacuated envelope pervious to said rays and being axially alined with said first envelope and containing a screen sensitive to said rays and exposed at the far end of the envelope to the beam rays entering the envelope in line with the envelope axis, said apparatus having an object point between said two envelopes on the beam axis, and means in said second envelope disposed ahead of said screen for producing a field of force, surrounding said beam and imposing thereon radial forces proportioned in direct ratio to the distance from the axis of the beam to change the cross-sectional area of the beam so that it tapers toward a focal point, the relative distances between said object point, said deflecting field, said focal point, and said screen being proportioned to satisfy the general optical formula $$\frac{1}{a}+\frac{1}{b}=\frac{1}{f}$$

to produce a sharply defined multiple size image of the object on said screen, said envelopes being disposed as close together as possible, allowing for the object between them.

12. Apparatus for projecting in an extended plane a stationary, visible image of an object onto a screen by means of electron rays, comprising means for producing a beam of said rays and for projecting it on a given directional axis, a screen sensitive to said rays disposed in the path of said beam, said apparatus having an object point on said axis between said ray producing means and said screen, means disposed between said object point and said screen for producing a plurality of spaced fields of force, each field adapted to completely surround said beam for electrically directionally controlling the rays of the beam as modified by said object in proportion to their different distances from said axis, an evacuated envelope containing said beam source, said object point, said field producing means and said screen, the envelope portion containing said object point having an evacuation degree lower than the evacuation degree of the remaining envelope portions, the system, comprising said object point, said several spaced fields, said focal point, and said screen, being proportioned to satisfy the general optical formula $$\frac{1}{a}+\frac{1}{b}=\frac{1}{f}$$

so as to produce a sharply defined multiple size image of the object on said screen, means for retarding the speed of the electrons in a given portion of said envelope, means for increasing the electron speed in another given portion of said envelope, the envelope portion in which the electron speed is retarded having a lower evacuation degree than the envelope portion in which the electron speed is increased, gas connections between the high speed and low speed envelope portions, and means for evacuating from the low speed envelope portion the gas entering from said high speed envelope portion.

REINHOLD RÜDENBERG.